(12) United States Patent
Matsui et al.

(10) Patent No.: US 10,470,273 B2
(45) Date of Patent: Nov. 5, 2019

(54) LIGHT EMISSION DRIVE DEVICE AND VEHICLE LAMP

(71) Applicant: Koito Manufacturing Co., Ltd., Tokyo (JP)

(72) Inventors: Kotaro Matsui, Shizuoka (JP); Yasushi Noyori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/982,046

(22) Filed: May 17, 2018

(65) Prior Publication Data

US 2018/0343722 A1 Nov. 29, 2018

(30) Foreign Application Priority Data

May 24, 2017 (JP) ................................. 2017-102908

(51) Int. Cl.
| | | |
|---|---|---|
| *H05B 37/02* | (2006.01) | |
| *B60Q 1/44* | (2006.01) | |
| *G05F 1/10* | (2006.01) | |
| *B60Q 1/52* | (2006.01) | |
| *H05B 33/08* | (2006.01) | |
| *B60Q 1/26* | (2006.01) | |

(52) U.S. Cl.
CPC ............... *H05B 37/02* (2013.01); *B60Q 1/44* (2013.01); *B60Q 1/52* (2013.01); *G05F 1/10* (2013.01); *H05B 33/0854* (2013.01); *B60Q 1/2607* (2013.01)

(58) Field of Classification Search
CPC ...... H05B 37/02; H05B 33/0854; B60Q 1/44; B60Q 1/52
See application file for complete search history.

(56) References Cited

U.S. PATENT DOCUMENTS

| | | | |
|---|---|---|---|
| 2009/0273290 A1* | 11/2009 | Ziegenfuss | ........ H05B 33/0815 315/193 |
| 2010/0052569 A1* | 3/2010 | Hoogzaad | .......... H05B 33/0818 315/294 |
| 2010/0181914 A1* | 7/2010 | Kasaba | .............. H05B 33/0818 315/80 |

FOREIGN PATENT DOCUMENTS

JP 2010-015752 A 1/2010

* cited by examiner

*Primary Examiner* — Anne M Hines
(74) *Attorney, Agent, or Firm* — Abelman, Frayne & Schwab; Charles Stein; Thomas Spath

(57) ABSTRACT

A light emission drive device includes a current supply unit, which supplies driving current to a light emitting element, which performs light emission of a first function and light emission of a second function, a controller, which controls the driving current so as to have a current value depending on a dimming voltage, and a dimming voltage generator, which generates the dimming voltage. The dimming voltage generator applies a voltage, obtained according to the resistance value of a connected external resistor, to a voltage buffer, and controls the output voltage of the voltage buffer according to whether to perform light emission of any one of the first function and the second function so as to generate the dimming voltage.

13 Claims, 9 Drawing Sheets

1ST COMPARATIVE EXAMPLE

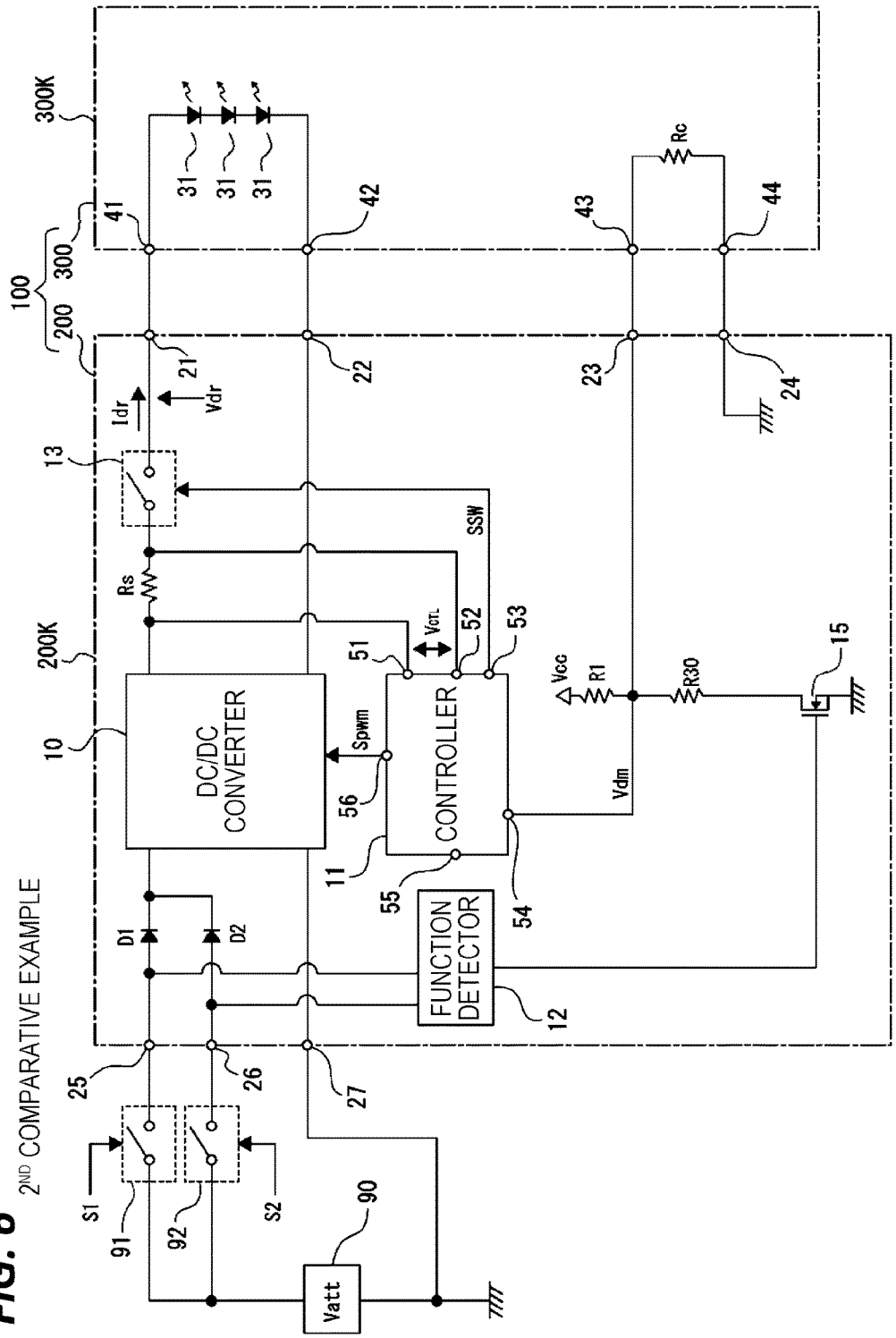
FIG. 6 2ND COMPARATIVE EXAMPLE

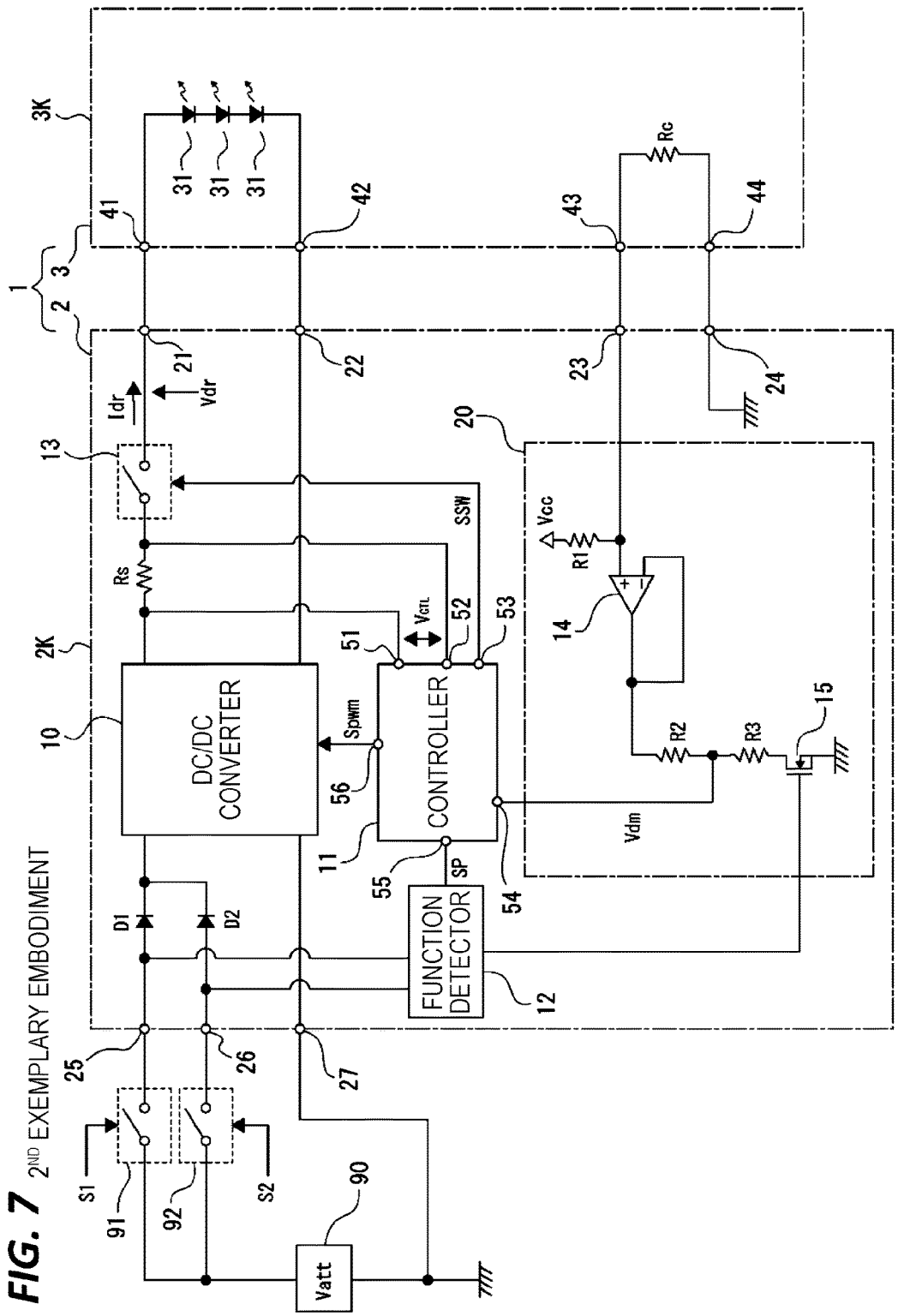
FIG. 7 2ND EXEMPLARY EMBODIMENT

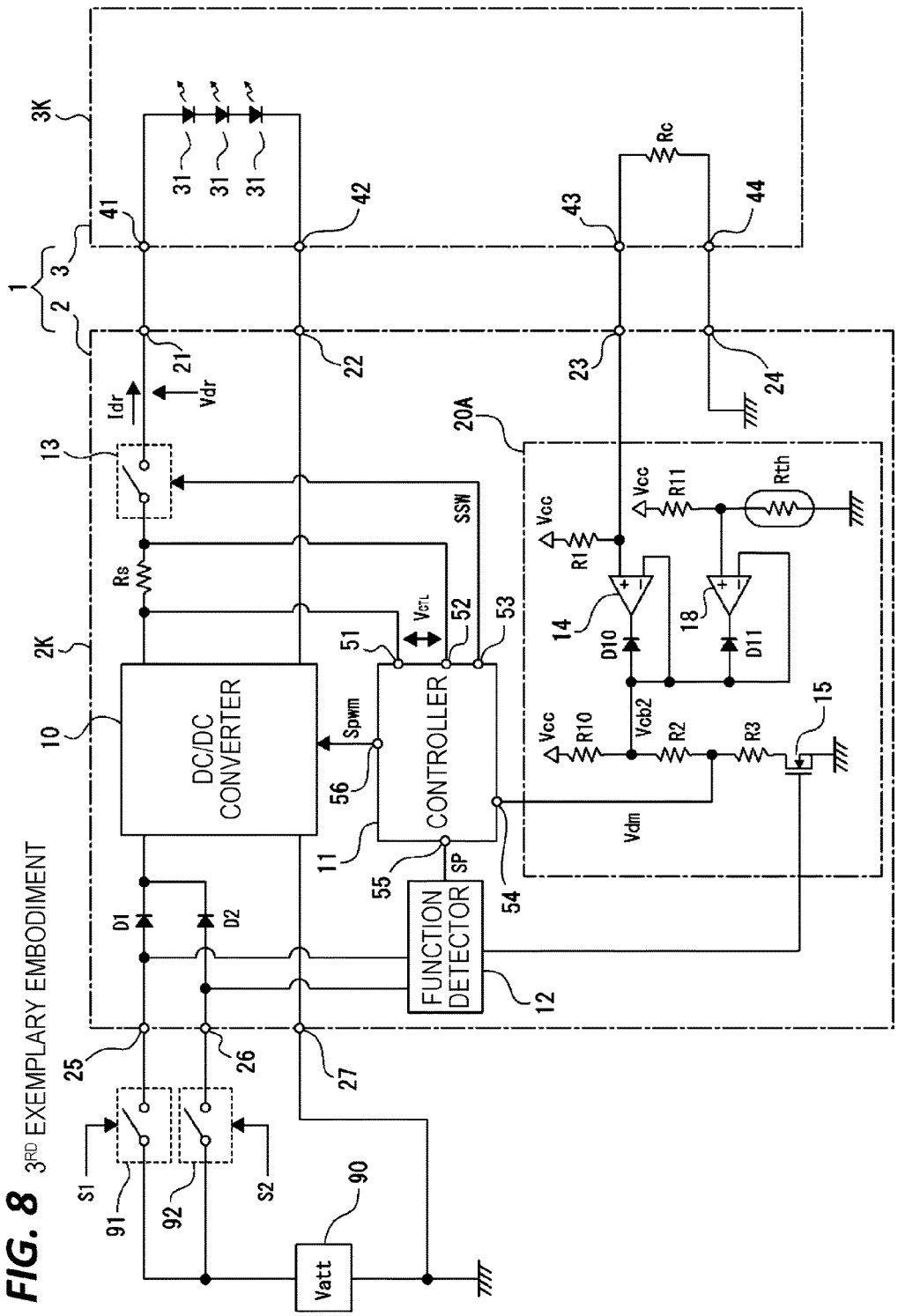
FIG. 8 3RD EXEMPLARY EMBODIMENT

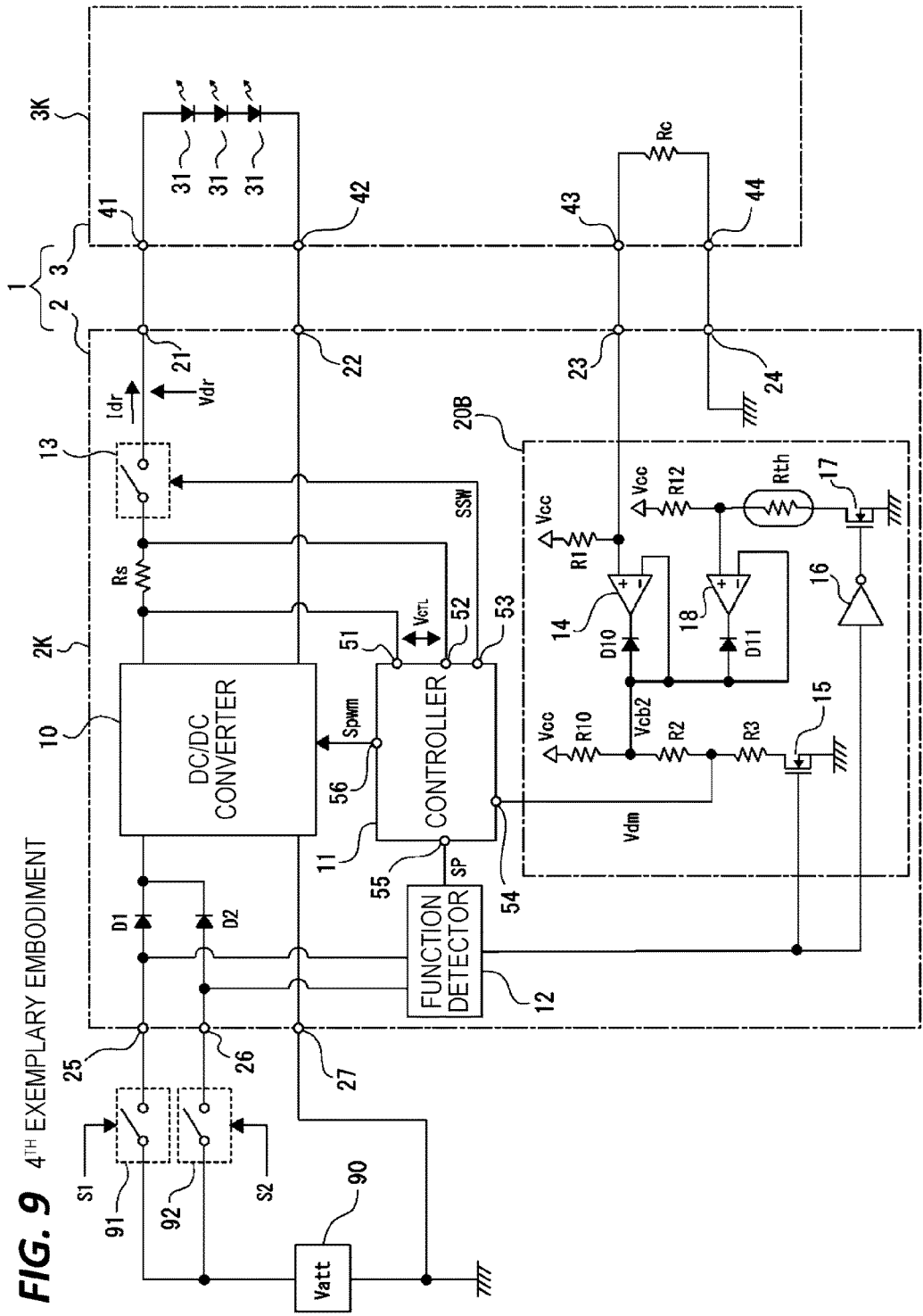
FIG. 9 4TH EXEMPLARY EMBODIMENT

LIGHT EMISSION DRIVE DEVICE AND VEHICLE LAMP

CROSS-REFERENCE TO RELATED APPLICATIONS

This application is based on and claims priority from Japanese Patent Application No. 2017-102908 filed on May 24, 2017 with the Japan Patent Office, the disclosure of which is incorporated herein in its entirety by reference.

TECHNICAL FIELD

The present disclosure relates to a light emission drive device and a vehicle lamp including the light emission drive device, and more particularly, to dimming control.

BACKGROUND

There are various lamps such as, for example, a vehicle lamp that uses, as a light source, a semiconductor light emitting element such as, for example, a light emitting diode (LED) or a laser diode.

In addition, there are vehicle lamps of various functions such as, for example, a head lamp, a daytime running lamp (DRL), a clearance lamp (CLL), a tail lamp, and a stop lamp, and, for example, the amount of light and the light distribution state thereof are designed according to the function thereof.

Japanese Patent Laid-Open Publication No. 2010-015752 discloses a lighting control device that controls lighting-on of a plurality of lamp units having different functions.

SUMMARY

In some cases, for example, an LED, which serves as a light source, is used for a plurality of functions. For example, a light source device configured with one or more LEDs are used for two functions such as a DRL and a CLL, or are used for two functions such as a tail lamp and a stop lamp.

When the same light source is used for a plurality of functions in this manner, dimming may be performed according to the function. That is, the amount of light to be emitted is changed according to the function.

On the other hand, in the case where a drive substrate, on which an electronic component as a light emission drive device is disposed, and a light source substrate, on which a light source such as an LED is mounted, are configured as separate substrates, in order to improve versatility of the light emission drive device, dimming may be performed according to the light source substrate to be connected thereto. For example, there is a configuration in which a resistor for dimming is provided on the light source substrate, and dimming control on the light emission drive device side is performed by a resistance value thereof.

In the case where dimming according to such two functions and dimming according to the light source substrate to be connected are considered, it is necessary to appropriately perform these dimming operations, respectively. That is, for example, it is necessary to avoid a change in the dimming ratio for each function by a resistor on the light source substrate side. In addition, an efficient configuration for performing each dimming is also required.

Accordingly, an object of the present disclosure is to propose an efficient configuration of a light emission drive device that is capable of appropriately executing each dimming.

SUMMARY

A light emission drive device according to the present disclosure includes a current supply unit configured to supply driving current as first current to a light emitting element so as to cause the light emitting element to perform light emission of a first function, and supply driving current as second current, which is smaller than the first current, to the light emitting element so as to cause the light emitting element to perform light emission of a second function, a dimming voltage generator configured to apply a voltage, obtained depending on a resistance value of a connected external resistor, to a voltage buffer, and vary an output voltage of the voltage buffer according to whether to cause the light emitting element to perform light emission of any one of the first function and the second function, so as to generate a dimming voltage, and a controller configured to control the driving current to the first current or the second current based on the dimming voltage.

In some cases, the external resistor is connected so as to adjust the driving current according to, for example, the rank of luminous flux on the light source device side having the light emitting element, so that a voltage value determined by the external resistor may be set to the dimming voltage. In addition to this dimming, in the case of dimming the light emitting element differently between the first function and the second function, the voltage value determined by the external resistor is acquired via the voltage buffer, and the voltage thereof varies depending on whether a light emission operation is the first function or the second function, and is set to the dimming voltage.

In the light emission drive device, it is considered that the controller is configured to control the driving current by a PWM dimming signal, in addition to the dimming voltage, and that the PWM dimming signal is supplied to the controller when causing the light emitting element to perform light emission of the second function.

That is, dimming control is performed through the cooperation of dimming (driving current control) by the dimming voltage and dimming (driving current control) by a PWM dimming signal.

In the light emission drive device, it is considered that the dimming voltage generator generates the dimming voltage that varies depending on a resistance value of a temperature sensor.

In this case, the dimming voltage also functions as a voltage for driving current control for temperature derating.

In the light emission drive device, it is considered that the dimming voltage generator is configured to prevent the dimming voltage from varying according to the resistance value of the temperature sensor when causing the light emitting element to perform light emission of the second function.

That is, during the second function in which light emission driving is performed with the lower second current, temperature derating is turned off.

In the light emission drive device, it is considered that the first function is light emission as a daytime running lamp and the second function is light emission as a clearance lamp, or the first function is light emission as a stop lamp and the second function is light emission as a tail lamp.

A vehicle lamp according to the present disclosure includes a light source device having the light emitting element, and the light emission drive device.

According to the present disclosure, since a dimming voltage is obtained by varying the output voltage of the voltage buffer, which reflects the resistance value of the external resistor, according to whether to perform light emission of any one of the first function and the second function, the dimming ratio depending on the function may not be unchanged by the external resistor. Therefore, it is possible to realize dimming control of both dimming depending on the external resistor and dimming depending on the function with an efficient configuration.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a circuit diagram of a second comparative example.

FIG. 7 is a circuit diagram of a second exemplary embodiment.

FIG. 8 is a circuit diagram of a third exemplary embodiment.

FIG. 9 is a circuit diagram of a fourth exemplary embodiment.

DESCRIPTION OF EMBODIMENT

First Exemplary Embodiment

Hereinafter, a vehicle lamp according to an exemplary embodiment will be described with reference to the drawings.

Figure 1:
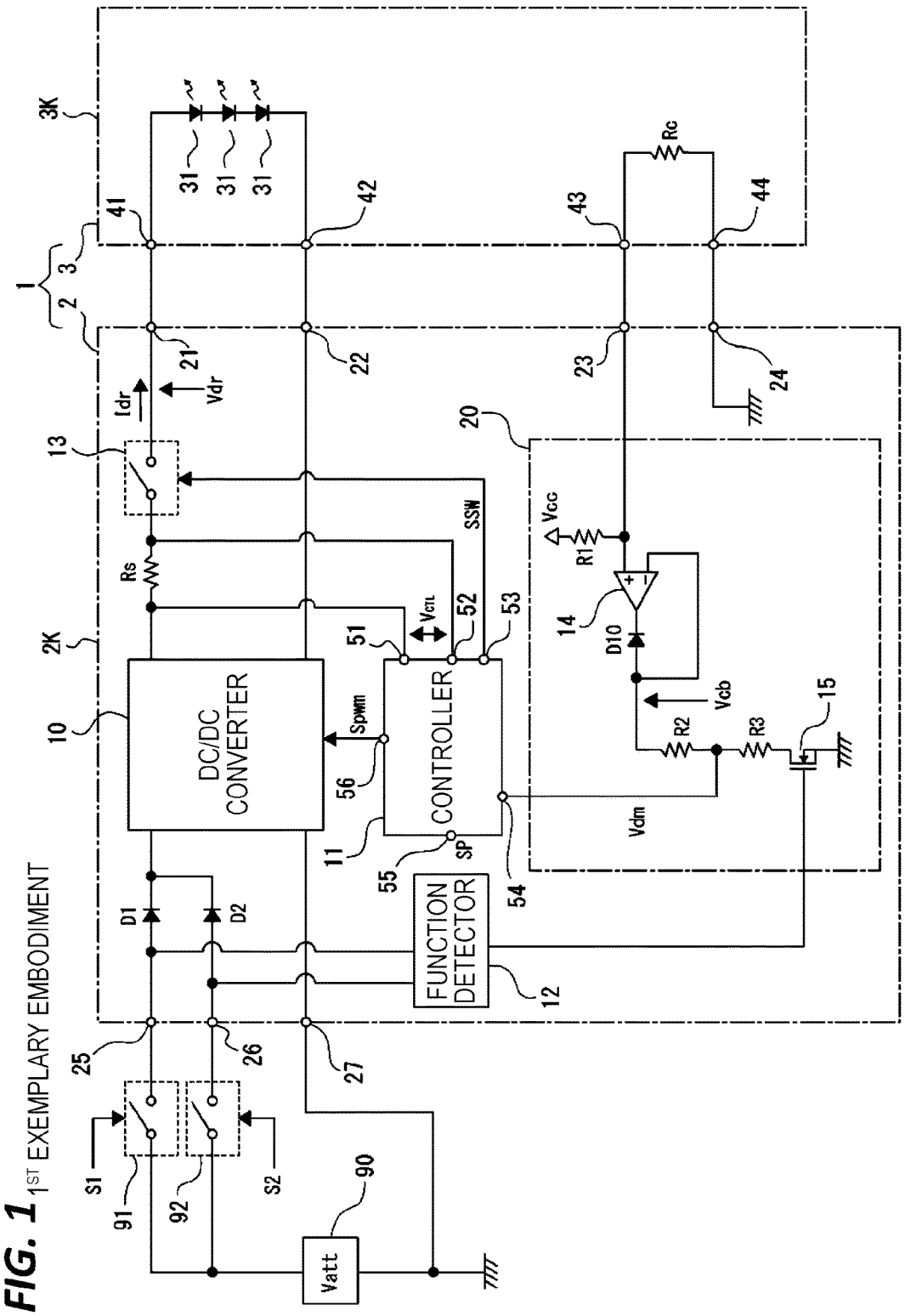
FIG. 1 is a circuit diagram of a first exemplary embodiment of the present disclosure.

As illustrated in FIG. 1, the vehicle lamp 1 according to the exemplary embodiment includes a light emission drive device 2 and a light source device 3.

The vehicle lamp 1 performs light emission of a first function and a second function by a common light source. Here, an example in which the first function is a DRL and the second function is a CLL will be described. In addition, two functions are not limited to the DRL and the CLL, but a plurality of other functions such as, for example, a stop lamp and a tail lamp may be used.

The light emission drive device 2 is configured with various electronic components disposed on a drive substrate 2K, for example.

In addition, the light source device 3 is formed to have one or a plurality of light emitting elements disposed on a light source substrate 3K, which is a substrate different from the above-described drive substrate 2K. Here, in an example, three LEDs 31 are used as the light emitting elements. However, the light emitting elements are not limited to the LEDs 31, and for example, laser diodes are also assumed. In addition, the number of light emitting elements may be one, and various serial or parallel connection configurations are considered when a plurality of light emitting elements is used.

In the light source device 3, three LEDs 31 are connected in series between terminals 41 and 42 provided on the light source substrate 3K. Then, driving current Idr, which is constant-current controlled, is supplied from the light emission drive device 2 to the three LEDs 31 so that the LEDs 31 are driven to emit light.

In addition, a coding resistor Rc is connected to the light source device 3 between the terminal 43 and a terminal 44 on the light source substrate 3K.

Further, the coding resistor Rc is a resistor for driving current adjustment that is provided according to the light emitting elements. The steady-state value of the driving current Idr is different according to the type of a light source, the number of light emitting elements, or the rank of luminous flux. Thus, the coding resistor Rc is disposed as an adjustment element so as to allow an appropriate driving current value to be obtained according to a light source configuration of the light source device 3.

Then, since the coding resistor Rc is based on a configuration of the light emitting elements, it is usually mounted on the light source device 3 side. That is, the coding resistor Rc is an external resistor of the light emission drive device 2.

The light emission drive device 2 is configured to receive power supplied from a battery 90 of a vehicle at a position between a terminal 25 or 26 and a terminal 27 provided on the drive substrate 2K.

A first switch 91 is inserted between a positive electrode terminal of the battery 90 and the terminal 25 of the light emission drive device 2, and a second switch 92 is also inserted between the positive electrode terminal of the battery 90 and the terminal 26 of the light emission drive device 2.

The terminal 27 on the drive substrate 2K is connected to a negative electrode side of the battery 90 via a grounding point.

The first switch 91 is a switch that turns on the first function by a signal S1. Assuming "DRL" as the first function, the first switch 91 is turned on by the signal S1 according to, for example, the ignition-on of the vehicle.

The second switch 92 is a switch that turns on the second function by a signal S2. Assuming "CLL" as the second function, the second switch 92 is turned on by the signal S2 corresponding to, for example, a vehicle width lamplight operation of an occupant (or automatic vehicle width lamp lighting control of the vehicle).

Further, the first function and the second function are exclusively executed. DRL lighting is executed in response to the ignition-on, but is switched to CLL lighting in response to the lighting of vehicle width lamps, even at the time of ignition-on. Thus, for example, when both the first switch 91 and the second switch 92 are turned on, the second function has priority.

As described above, the lighting-on/off of the vehicle lamp 1 and the section of the functions are controlled by the on/off of the first switch 91 and the second switch 92.

In the light emission drive device 2, the terminals 25 and 26 are connected to a function detector 12. The function detector 12 determines whether any one of the lighting-off, the first function, and the second function is currently instructed by detecting voltage values of the terminals 25 and 26.

Further, although not illustrated, the light emission drive device 2 may be configured to be communicatively connected to an electronic control unit (ECU) that performs electrical control on the vehicle side. In that case, a configuration is also considered, which allows a power voltage line and a ground line from the battery 90 to be connected to the terminals 25, 26, and 27 via the ECU and allows the ECU to control power supply to the light emission drive device 2.

In the light emission drive device 2, a battery voltage supplied to the terminals 25 and 26 is applied to a DC/DC converter 10 via a diode-OR circuit formed by diodes D1 and D2.

The DC/DC converter 10 is a current supply unit that supplies the driving current Idr to the LED 31 of the light source device 3.

The DC/DC converter 10 is, for example, a switching regulator. It is considered that the DC/DC converter 10 is any of a step-up type, a step-down type, and a step-up and step-down type, although this depends on a relationship between a light source configuration (e.g., forward drop voltage) of the light source device 3 and a power voltage by the battery 90.

The DC/DC converter 10 performs voltage conversion when receiving a DC voltage from the battery 90, and generates an output voltage Vdr. The output voltage Vdr appears between the terminals 21 and 22 provided on the drive substrate 2K via a current detection resistor Rs and a dimming switch 13.

Between the drive substrate 2K and the light source substrate 3K, connection between the terminal 21 and the terminal 41 and connection between the terminal 22 and the terminal 42 are achieve by a harness. Therefore, the driving current Idr, which is based on the output voltage Vdr appearing on the output side of the DC/DC converter 10, flows in the sequence of the terminal 21→the terminal 41→the three LEDs 31→the terminal 42→the terminal 22.

A controller 11 executes a voltage conversion operation of the DC/DC converter 10 and performs the constant current control of the driving current Idr.

For example, the controller 11 detects a current value of the driving current Idr based on the result of detecting the potential difference (control target voltage VCTL) between one end and the other end of the current detection resistor Rs with two terminals 51 and 52. Then, the controller 11 compares the detected current value of the driving current Idr with a target current value, and generates a switching control signal Spwm, which is a PWM signal corresponding to the difference. The controller 11 supplies the switching control signal Spwm from a terminal 56 to a switching element of a switching converter, which is the DC/DC converter 10, to control the voltage conversion operation, and realize constant current output.

In addition, a dimming voltage Vdm generated by a dimming voltage generator 20 is supplied to a terminal 54 of the controller 11. The controller 11 increases or decreases the target current value based on the dimming voltage Vdm, whereby dimming control is executed.

In addition, a terminal 55, to which a pulse width modulation (PWM) dimming signal SP to be described later is input, may be prepared in the controller 11. When the PWM dimming signal SP is input to this terminal, dimming control is executed according to the pulse duty of the PWM dimming signal SP.

In addition, the controller 11 may output a dimming switch control signal SSW from a terminal 53 to the dimming switch 13 based on the PWM dimming signal SP.

When the dimming switch 13 is turned on, the driving current Idr is supplied to the LED 31. The dimming switch 13 is turned on and off by the dimming switch control signal SSW, whereby dimming may be performed.

Figure 2:
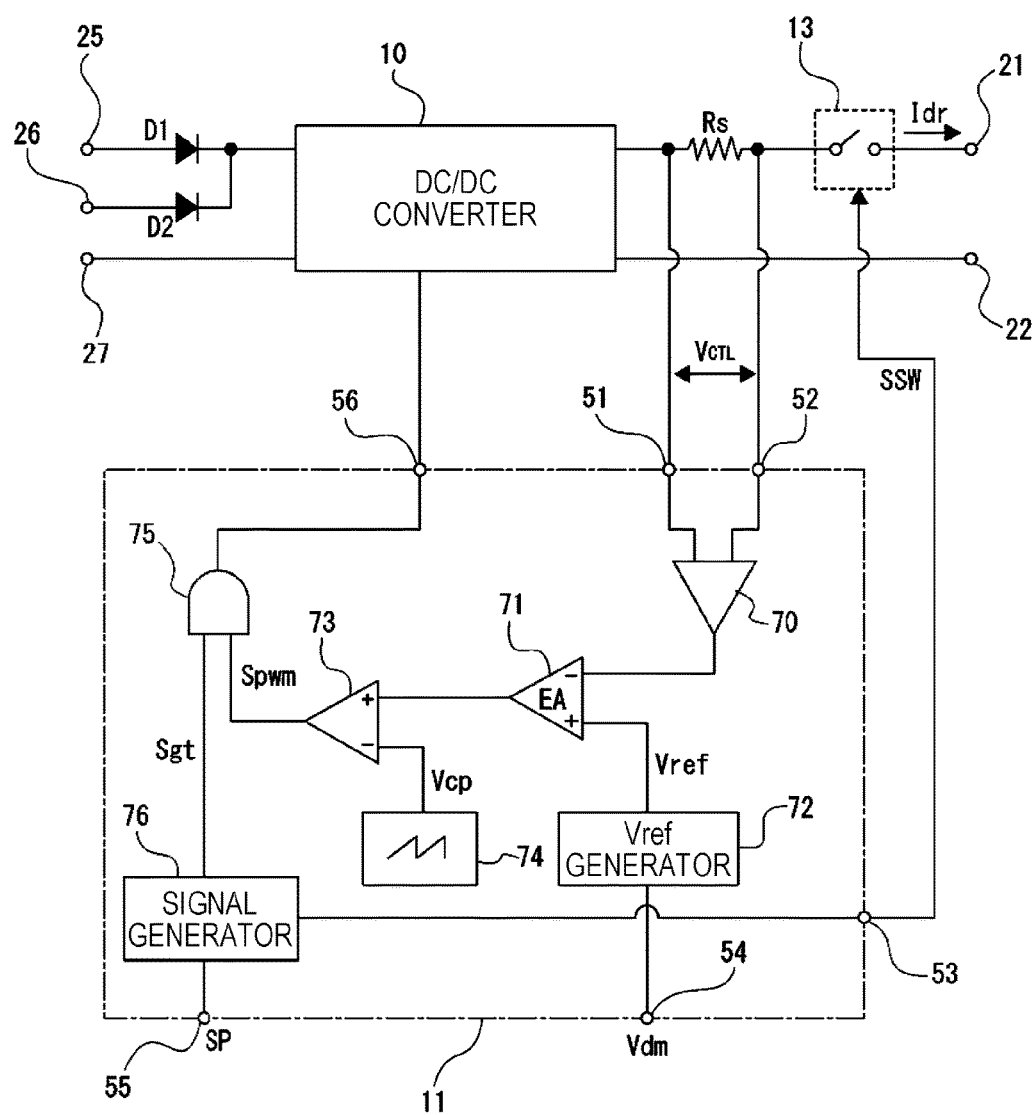
FIG. 2 is a block diagram of a configuration of a controller according to the exemplary embodiment.

A schematic configuration example of such a controller 11 is illustrated in FIG. 2.

The controller 11 detects the voltage difference between both the ends of the current detection resistor Rs (control target voltage VCTL) by a current detection amplifier 70. An error amplifier 71 obtains an error signal Ve by taking the difference between the control target voltage VCTL and a reference voltage signal Vref generated by a reference voltage generator 72.

The error signal Ve is compared with a comparison signal Vcp, generated in a comparison signal generator 74, by an error comparator 73. The comparison signal Vcp is, for example, a sawtooth wave signal. Therefore, the switching control signal Spwm having a pulse duty depending on a current error amount is obtained from the error comparator 73. The switching control signal Spwm is output from the terminal 56 to the DC/DC converter 10 through an AND gate 75, and the switching element of the DC/DC converter 10 is controlled to be turned on and off, whereby stabilization of output current is promoted.

For example, when the controller 11 adopts such an output stabilization configuration, dimming control may be performed by the following method.

For example, the reference voltage generator 72 generates the reference voltage Vref according to the dimming voltage Vdm input from the terminal 54. Specifically, the reference voltage generator 72 sets the dimming voltage Vdm to the reference voltage Vref within the upper limit of a voltage value of the reference voltage Vref, or performs a processing such as, for example, division of the dimming voltage Vdm or coefficient multiplication to generate the reference voltage Vref. Thereby, the target value for stabilization is changed, and dimming control, that is, current control for increasing or decreasing the driving current Idr becomes possible.

Further, in this example, although the reference voltage Vref is changed, according to the dimming voltage Vdm, a plus offset or a minus offset may be given to the comparison signal Vcp generated by the comparison signal generating unit 74, or a plus offset or a minus offset may be given to the detection signal Vd or the error signal Ve.

Although the above method is an example in which the output current of the DC/DC converter 10 is lowered in a DC manner, the average current of the DC/DC converter 10 may be lowered according to the above-described PWM dimming signal.

When the PWM dimming signal SP is input to the terminal 55, a signal generator 76 generates a gate control signal Sgt, and supplies the same to the AND gate 75. The PWM dimming signal SP may be used as the gate control signal Sgt. Then, for example, the period during which the PWM dimming signal SP is at a low level (L level) is set to a converter stop period during which the switching control signal Spwm is not supplied to the DC/DC converter 10 and the driving current Idr does not flow. Thereby, dimming becomes possible by the duty ratio of the PWM dimming signal SP. Further, the switching control signal Spwm corresponds to a sufficiently higher frequency than the PWM dimming signal SP.

In addition, the signal generator 76 generates the dimming switch control signal SSW based on the PWM dimming signal SP, and supplies the same from the terminal 53 to the dimming switch 13. Thus, for example, the period during which the PWM dimming signal SP is at the L level may be set to the period during which the driving current Idr with the supply of 1 does not flow to the LED 31, and dimming may be performed by the duty ratio of the PWM dimming signal SP.

In addition, although dimming control by the PWM dimming signal SP is possible as described above, the first exemplary embodiment of FIG. 1 illustrates an example in which the PWM dimming signal SP is not used. Thus, in a case of the first exemplary embodiment, it is also assumed that the controller 11 is not provided with include the terminals 55 and 53, the signal generator 76, and the AND gate 75.

In the first exemplary embodiment, the controller 11 performs dimming control based on the dimming voltage Vdm applied to the terminal 54.

Returning to FIG. 1, the dimming voltage generator 20 will be described.

The dimming voltage generator 20 includes a voltage buffer 14, a function corresponding switch 15, and resistors R1, R2, and R3.

The voltage buffer 14 is configured with an operational amplifier, which is connected in a voltage follower manner. The resistor R1 and the terminal 23 are connected to a non-inverting input terminal of the voltage buffer 14. A voltage Vcc is applied to the other end of the resistor RE In addition, between the driving substrate 2K and the light source substrate 3K, connection between the terminal 23 and the terminal 43 and connection between the terminal 24 and the terminal 44 are achieved by a harness. The terminal 24 is connected to the ground.

Thus, the resistor R1 and the coding resistor Rc are directly connected between the voltage Vcc and the ground, and a voltage, which is obtained by dividing the voltage Vcc by the resistor R1 and the coding resistor Rc, is input to the non-inverting input terminal of the voltage buffer 14.

Then, a buffer output voltage Vcb corresponding to the divided voltage is obtained as the output of the voltage buffer 14 with the gain of 1.

The resistors R2 and R3 and the function corresponding switch 15 are connected in series between an output terminal of the voltage buffer 14 and the ground. The function corresponding switch 15 is, for example, an N channel MOS-FET, and is turned on and off when a gate voltage depending on the function is applied from the function detector 12 to a gate thereof. Specifically, when the first function is determined, the function corresponding switch 15 is turned off, and when the second function is determined, the function corresponding switch 15 is turned on.

Then, a voltage at the connection point of the resistors R2 and R3 is supplied, as the dimming voltage Vdm, to the terminal 54 of the controller 11. Thus, during the first function, the dimming voltage Vdm becomes substantially the voltage value of the buffer output voltage Vcb, and during the second function, the dimming voltage Vdm is the voltage value obtained by dividing the buffer output voltage Vcb using the resistors R2 and R3.

The dimming voltage Vdm is determined by the presence or absence of the voltage divided by the resistors R2 and R3 based on the buffer output voltage Vcb determined according to the coding resistor Rc.

Thus, as the dimming voltage Vdm, a voltage value that instructs the driving current Idr (first current) during the first function and a voltage value that instructs the driving current Idr (second current) during the second function are set by the resistors R2 and R3. In other words, the dimming ratio of the first function and the second function is set by the resistors R2 and R3.

Figure 3:
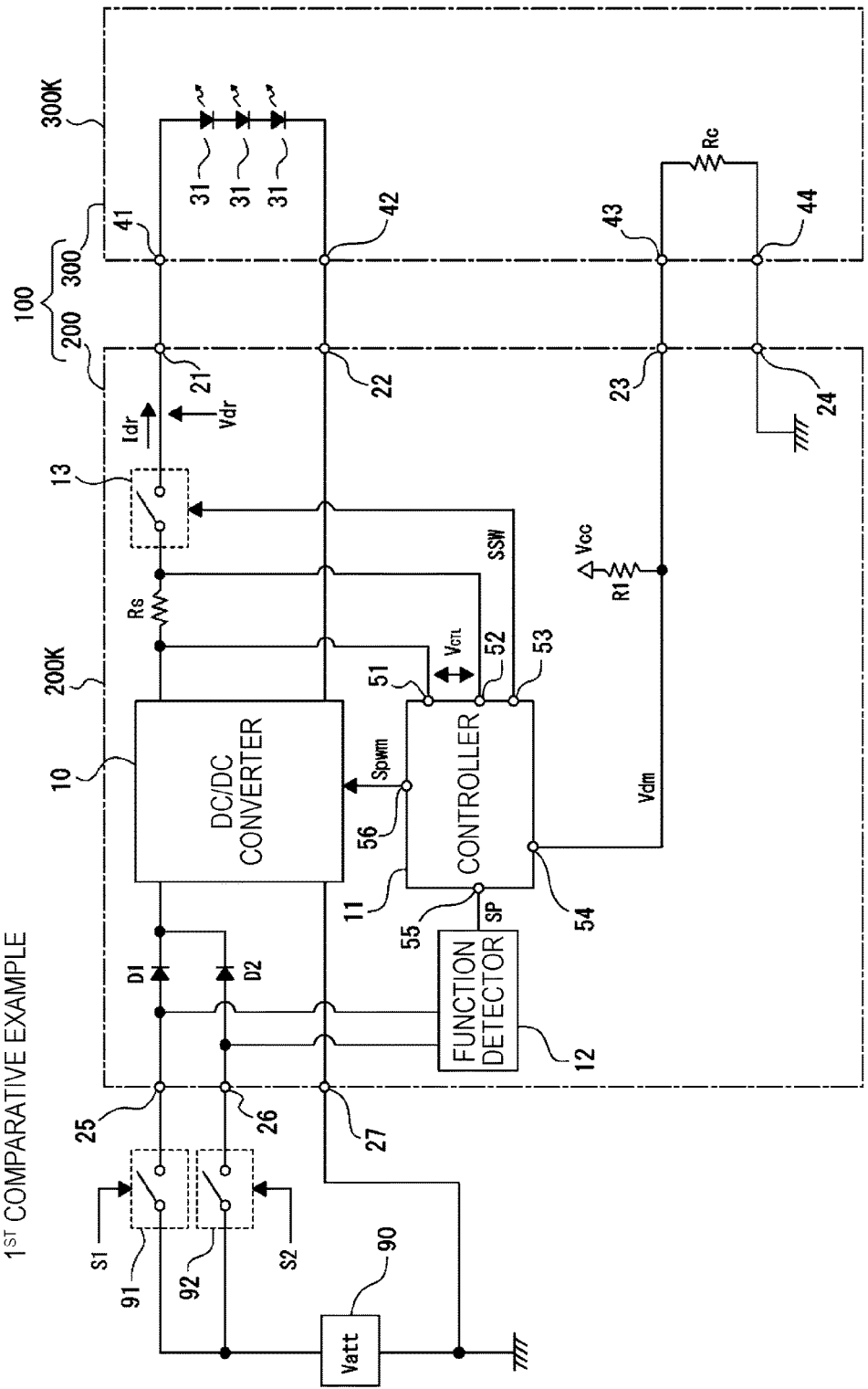
FIG. 3 is a circuit diagram of a first comparative example.

Here, in order to explain the effect of the configuration of the first exemplary embodiment, a comparative example will be considered. FIG. 3 illustrates a vehicle lamp 100 having a light emission drive device 200 and a light source device 300 as a first comparative example. Further, in the comparative example and the exemplary embodiment to be described hereinafter, the same circuit constituent elements as those in FIG. 1 will be denoted by the same reference numerals, a repeated description thereof will be omitted, and only different elements will be described.

In the first comparative example, a drive substrate 200K and a light source substrate 300K are also separate members, and the coding resistor Rc is mounted on the light source substrate 300K.

In the drive substrate 200K of the light emission drive device 200, the dimming voltage Vdm is set to a voltage depending on the coding resistor Rc, and dimming depending on the first function and the second function is performed by the PWM dimming signal SP.

Thus, the voltage, which is obtained by dividing the voltage Vcc by the resistor R1 and the coding resistor Rc, is supplied, as the dimming voltage Vdm, to the terminal 54 of the controller 11.

Figure 4A:
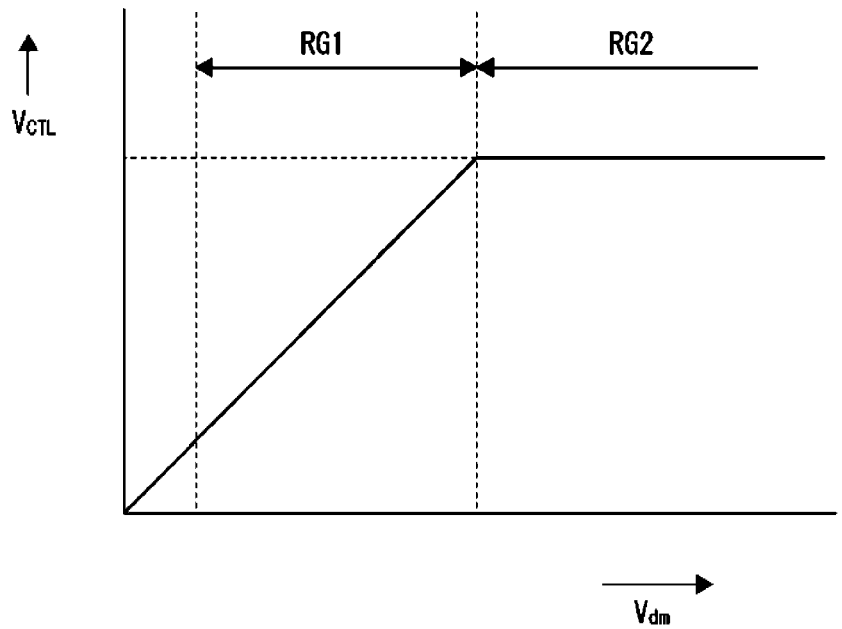
FIGS. 4A and 4B are explanatory diagrams of the setting range of a coding resistor.
Figure 4B:
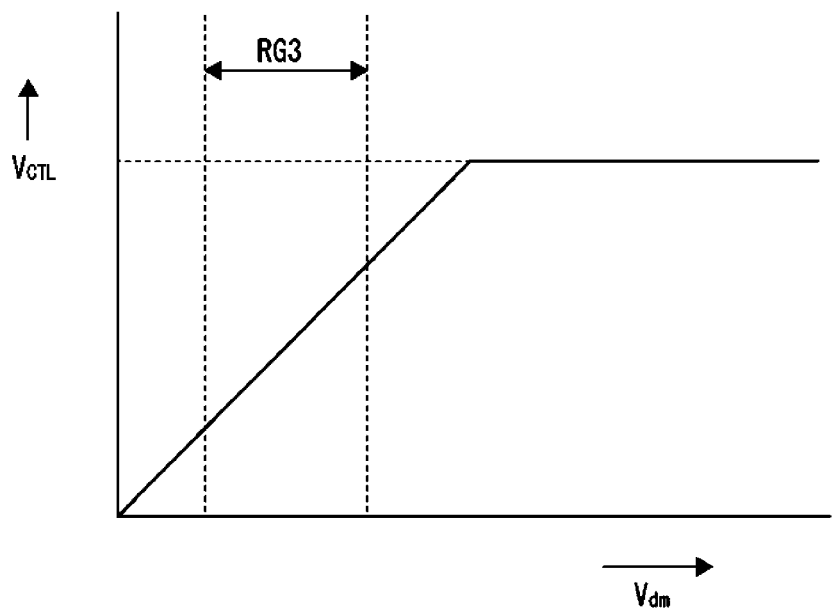

In FIG. 4B, the horizontal axis represents the dimming voltage Vdm and the vertical axis represents the control target voltage VCTL, but the dimming range by the coding resistor Rc is, for example, a range RG3 in FIG. 4B.

Figure 5A:
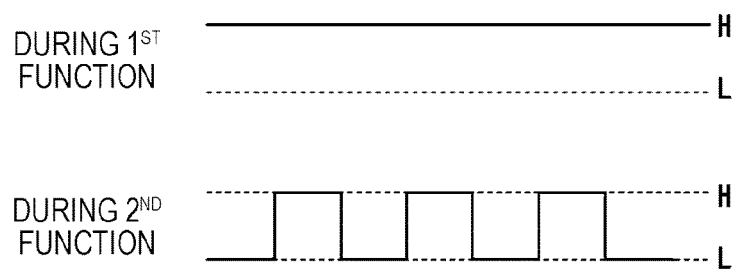
FIGS. 5A and 5B are explanatory diagrams of a PWM dimming signal.
Figure 5B:
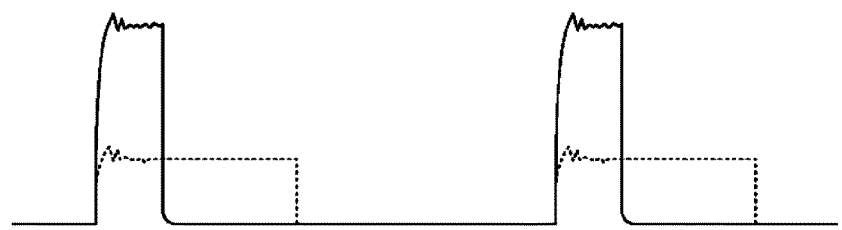

Meanwhile, in a case of the first comparative example, the function detector 12 generates the PWM dimming signal SP depending on whether first function or the second function is determined, and supplies the same to the terminal 55 of the controller 11. For example, as illustrated in FIG. 5A, the function detector 12 continuously supplies a signal, which is at a high level (H level), to the controller 11 during the first function, and supplies the PWM dimming signal SP to the controller 11 during the second function.

Thus, the switching control signal Spwm of FIG. 2, for example, is continuously supplied to the switching element of the DC/DC converter 10 via the AND gate 75 during the first function, but the converter stop period, during which the supply of the switching control signal Spwm stops and the dimming switch 13 is turned off, is generated during the second function. That is, this period is the period during which the PWM dimming signal SP is at the L level.

Thus, after dimming depending on the coding resistor Rc is performed, dimming control is executed at a dimming ratio determined by the pulse duty ratio of the PWM dimming signal SP during the first function and the second function.

However, when the dimming during the first function and the second function is performed using the PWM dimming signal SP, a problem of deterioration in emission noise occurs due to a rapid change in current.

In addition, when the dimming ratio of the first function and the second function is large, the on-duty ratio during the second function is greatly reduced. In that case, waveform reproducibility may be deteriorated, and for example, flickering of the light source may occur.

Therefore, when it is considered that dimming control using the PWM dimming signal SP is not performed, a second comparative example of FIG. 6 is assumed. In this case, the light emission drive device 200 connects the resistors R1 and R30 and the function corresponding switch 15 in series between the voltage Vcc and the ground. Then, the light emission drive device 200 connects the connection point of the resistor R1 and the resistor R30 to the terminal 54 of the controller 11 and the terminal 23 of the drive substrate 200K. Thus, the coding resistor Rc is connected in parallel to the resistor R30.

In this case, the dimming voltage Vdm is a voltage value that reflects the resistance value of the coding resistor Rc and the ON/OFF of the function corresponding switch 15.

However, in this case, the dimming ratio of the first function and the second function is changed by the resistance value of the coding resistor Rc. This is because the division ratio for obtaining the dimming voltage Vdm is different according to the coding resistor Rc.

Accordingly, the configuration of the first exemplary embodiment illustrated in FIG. 1 becomes suitable.

That is, a buffer output voltage Vcb, which is the reference reflecting the coding resistor Rc, may be obtained via the voltage buffer 14, and the dimming ratio of the first function and the second function (the voltage ratio of the dimming voltage Vdm) may be determined based on the buffer output voltage. Therefore, the dimming voltage Vdm of the first exemplary embodiment reflects the resistance value of the coding resistor Rc, and in cases of the first function and the second function, the dimming voltage Vdm, at which the dimming ratio is constant, may be obtained regardless of the coding resistor Rc.

Thereafter, by not using the PWM dimming signal SP, it is possible to solve the problem caused when using the above-described PWM dimming signal SP.

In FIG. 4A, the horizontal axis represents the dimming voltage Vdm and the vertical axis represents the control target voltage VCTL, as in FIG. 4B. In a case of the first exemplary embodiment, the settable range by the coding resistor Rc is a range RG1. This is because, when a range RG2 is set, the dimming ratio of the first function and the second function depends on the coding resistor Rc.

Second Exemplary Embodiment

FIG. 7 illustrates a vehicle lamp 1 according to a second exemplary embodiment. The difference from the first exemplary embodiment illustrated in FIG. 1 is that the controller 11 controls dimming by additionally using the PWM dimming signal SP applied to the terminal 55.

During the first function, the function detector 12 turns off the function corresponding switch 15, and continuously supplies a H-level signal to the terminal 55 of the controller 11, as illustrated in FIG. 5A. In addition, during the second function, the function detector 12 turns on the function corresponding switch 15, and also supplies the PWM dimming signal SP having a predetermined duty ratio to the terminal 55 of the controller 11, as illustrated in FIG. 5A.

That is, during the first function, only DC dimming based on the dimming voltage Vdm is used, and during the second function, DC dimming based on the dimming voltage Vdm and PWM dimming based on the PWM dimming signal SP are used together.

Thereby, while maintaining a constant dimming ratio of the first function and the second function without using the coding resistor Rc (that is, while maintaining high current precision of both the first function and the second function), during the second function, DC dimming may be applied to the guaranteed minimum current of the LED 31 and PWM dimming may also be applied. In this way, it is possible to lower the current to a low value even while maintaining the on-duty time of the output voltage Vdr to some extent.

For example, the solid line in FIG. 5A indicates a case where the on-duty time is very short in the first comparative example of FIG. 3. In a case of the second exemplary embodiment, even if the on-duty time is kept to some extent as indicated by the broken line by lowering the driving current Idr by DC dimming, it is possible to obtain the same dimming level as that in a case of the solid line.

Accordingly, in the second exemplary embodiment, it is possible to obtain a high dimming ratio, which cannot be reproduced in the first comparative example.

Third Exemplary Embodiment

A third exemplary embodiment will be described with reference to FIG. 8. The light emission drive device 2 in the third exemplary embodiment is an example in which a dimming voltage generator 20A having a temperature derating function is provided. A configuration other than the dimming voltage generator 20A is the same as that in FIG. 1 or 7.

The dimming voltage generator 20A includes voltage buffers 14 and 18, the function corresponding switch 15, resistors R1, R2, R3, R10 and R11, diodes D10 and D11, and a thermistor Rth.

The voltage buffers 14 and 18 are configured with an operational amplifier, which is connected in a voltage follower manner.

As in FIG. 1, the resistor R1 and the terminal 23 are connected to the non-inverting input terminal of the voltage buffer 14, and the voltage Vcc is applied to the other end of the resistor R1. Thus, the voltage, which is obtained by dividing the voltage Vcc by the resistor R1 and the coding resistor Rc, is input to the non-inverting input terminal of the voltage buffer 14.

A cathode of the diode D10 is connected to the output terminal of the voltage buffer 14, and an anode of the diode D10 is connected to an inverting input terminal of the voltage buffer 14 and the connection point of the resistors R10 and R2. The voltage at the connection point of the resistors R10 and R2 is illustrated as a buffer output voltage Vcb2.

The connection point of the resistor R11 and the thermistor Rth is connected to a non-inverting input terminal of the voltage buffer 18, and the voltage Vcc is applied to the other end of the resistor R11. Thus, a voltage, which is obtained by dividing the voltage Vcc by the resistor R11 and the thermistor Rth, is input to the non-inverting input terminal of the voltage buffer 18. A cathode of the diode D11 is connected to the output terminal of the voltage buffer 18, and an anode of the diode D11 is connected to an inverting input terminal of the voltage buffer 18 and the connection point of the resistors R10 and R2.

The thermistor Rth is a negative temperature coefficient (NTC) thermistor, and the resistance value thereof decreases as the temperature rises. Thus, as the temperature rises, the voltage at the non-inverting input terminal of the voltage buffer 18 decreases.

The resistors R10, R2 and R3 and the function corresponding switch 15 are connected in series between the voltage Vcc and the ground. The function corresponding switch 15 is turned off when the first function is determined by the function detector 12, and is turned on when the second function is determined by the function detector 12.

The voltage at the connection point of the resistors R2 and R3 is supplied, as the dimming voltage Vdm, to the terminal 54 of the controller 11.

With this configuration, the buffer output voltage Vcb2 at the connection point of the resistors R10 and R2 is changed to a lower one of the divided voltage of the resistor R1 and the coding resistor Rc and the divided voltage of the resistor R11 and the thermistor Rth. Therefore, the buffer output voltage Vcb decreases at a high temperature by a temperature derating function when the setting by the coding resistor Rc is reflected. In addition, since the buffer output voltage Vcb2 at the connection point of the resistors R10 and R2 is divided or not divided by the function corresponding switch 15, the dimming voltage Vdm during the first function and the second function becomes a voltage signal of the dimming ratio determined by the resistors R2 and R3.

Thus, while applying the dimming function for temperature derating, the dimming ratio of the first function and the second function may not be changed depending on the coding resistor Rc or the temperature condition.

Fourth Exemplary Embodiment

A fourth exemplary embodiment will be described with reference to FIG. 9. In the fourth exemplary embodiment, a dimming voltage generator 20B of the light emission drive device 2 is obtained by adding an inverter 16 and a derating control switch 17 to the dimming voltage generator 20A in FIG. 8.

That is, the derating control switch 17 is inserted between the thermistor Rth and the ground, and the function detector 12 controls the derating control switch 17 together with the function corresponding switch 15. Specifically, the function detector 12 inverts a gate voltage supplied to the function corresponding switch 15 by the inverter 16, and supplies the inverted gate voltage to the gate of the derating control switch 17.

In this case, during the first function, the function corresponding switch 15 is turned off, and the derating control switch 17 is turned on. In addition, during the second function, the function corresponding switch 15 is turned on, and the derating control switch 17 is turned off.

Thus, during the second function, temperature derating is not performed. That is, during the second function, the buffer output voltage Vcb2 is not changed according to the temperature.

That is, this configuration is an example that is used when temperature derating is not executed during one function.

<Summary and Modifications>

In each of the above exemplary embodiments, the light emission drive device 2 includes the DC/DC converter 10, which supplies the driving current as first current to the light emitting element (LED) 31 to cause the light emitting element 31 to perform light emission of the first function, and also supplies the driving current as second current, which is smaller than the first current, to the light-emitting element to cause the light emitting element to perform light emission of the second function. In addition, the light emission drive device 2 includes the dimming voltage generator 20, which applies a voltage, obtained depending on a resistance value of a connected coding resistor Rc, to the voltage buffer 14, and varies the output voltage Vcb of the voltage buffer 14 according to whether to cause the light emitting element 31 to perform light emission of any one of the first function and the second function, so as to generate the dimming voltage Vdm, and the controller 11, which controls the drive current Idr to the first current or the second current based on the dimming voltage Vdm.

That is, a voltage value for dimming determined by the coding resistor Rc, which is an external resistor, is acquired via the voltage buffer 14, and the voltage thereof is varied to the dimming voltage Vdm according to whether a light emission operation is the first function or the second function.

The coding resistor Rc adjusts the driving current according to, for example, the rank of luminous flux. However, with a configuration in which a divided voltage determined by the resistor R1 and the coding resistor Rc is varied according to whether the first function or the second function is determined, the driving current ratio (dimming ratio) in cases of the first function and the second function is changed by the coding resistor Rc. That is, the driving current ratio is the ratio of the first current to the second current.

To be understood from comparison between the exemplary embodiment and the comparative example, by transmitting a voltage determined by the coding resistor Rc via the voltage buffer 14, which is a voltage follower with a gain of 1, and varying the output voltage of the voltage buffer 14 during the first function and during the second function, the dimming ratio of the first function and the second function may be constant regardless of the value of the coding resistor Rc.

In addition, since dimming control is not performed by the PWM signal, it is possible to prevent deterioration in emission noise. In addition, there is no adverse effect due to deterioration in waveform reproducibility at a low duty in dimming control by the PWM signal.

In the second exemplary embodiment, the controller 11 is controllable the driving current Idr by the PWM dimming signal SP, in addition to the dimming voltage Vdm, and the PWM dimming signal SP is supplied to the controller 11 when causing the light emitting element to perform light emission of the second function.

That is, dimming control is performed by cooperation of dimming (driving current control) by the dimming voltage Vdm and dimming (driving current control) by the PWM dimming signal SP.

In this manner, a higher dimming ratio may be realized by combining dimming by the dimming voltage Vdm and dimming by the PWM dimming signal SP.

In the third and fourth exemplary embodiments, the dimming voltage generator 20A or 20B generates the dimming voltage Vdm, which is varied according to the resistance value of the thermistor Rth. That is, the dimming voltage Vdm also functions as a voltage for driving current control for temperature derating.

Thereby, it is possible to realize all of driving current control depending on the coding resistor Rc, driving current control for temperature derating, and driving current control for the first function and the second function by the dimming voltage Vdm, and to achieve an efficient configuration.

In the fourth exemplary embodiment, when causing the light emitting element to perform light emission of the second function, the dimming voltage generator 20B prevents the dimming voltage Vdm from varying according to the resistance value of a temperature sensor (thermistor Rth). That is, temperature derating is turned on during the first function, and temperature derating is turned off during the second function.

Thereby, it is possible to realize a configuration in which the temperature derating control using the dimming voltage is turned on or off according to the function. That is, according to the function, it is possible to select an operation of not performing dimming by temperature derating.

Particularly, in a case of the second function, since the value of the driving current Idr is small, protection of the light emitting element is unnecessary, and on the contrary, the brightness is a priority, it is possible to realize the operation of not performing dimming by temperature derating.

In addition, FIGS. 8 and 9 illustrates a circuit example using both DC dimming and dimming by the PWM dimming signal SP, as with the second exemplary embodiment of FIG. 7, but the configuration of performing only DC dimming as in FIG. 1 may adopt the dimming voltage generator 20A or 20B in FIGS. 8 and 9.

The respective exemplary embodiments have described an example in which the first function is light emission as a daytime running lamp and the second function is light emission as a clearance lamp.

In addition to this, it is also considered that the first function is light emission as a stop lamp and the second function is light emission as a tail lamp. That is, the present disclosure is useful with respect to two functions of performing light emission with a light quantity difference using a common light emitting element.

The present disclosure is not limited to the configuration of the above exemplary embodiment, and various modifications are considered.

In the exemplary embodiment, the light emitting element 31 performs light emission of two functions, but the disclosure is not limited to the two functions, and the present disclosure may also be applied to a case where three or more functions uses a common light source.

For example, a configuration of switching the output voltage of the buffer according to whether to execute any one of three functions is assumed.

In addition, a specific configuration of the light emission drive device 2, the DC/DC converter 10, the controller 11, and the dimming voltage generator 20 (20A and 20B) is not limited to the above example.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A light emission drive device comprising:
   a current supply unit configured to supply driving current as first current to a light emitting element so as to cause the light emitting element to perform light emission of a first function, and supply driving current as second current, which is smaller than the first current, to the light emitting element so as to cause the light emitting element to perform light emission of a second function;
   a dimming voltage generator configured to apply a voltage, obtained depending on a resistance value of a connected external resistor, to a voltage buffer, and vary an output voltage of the voltage buffer according to whether to cause the light emitting element to perform light emission of any one of the first function and the second function, so as to generate a dimming voltage; and
   a controller configured to control the driving current to the first current or the second current based on the dimming voltage.

2. The light emission drive device of claim 1, wherein the controller is configured to control the driving current by a PWM dimming signal as well, in addition to the dimming voltage, and wherein the PWM dimming signal is supplied to the controller when causing the light emitting element to perform light emission of the second function.

3. The light emission drive device of claim 2, wherein the dimming voltage generator generates the dimming voltage that varies depending on a resistance value of a temperature sensor.

4. The light emission drive device of claim 3, wherein the dimming voltage generator is configured to prevent the dimming voltage from varying depending on the resistance value of the temperature sensor when causing the light emitting element to perform light emission of the second function.

5. The light emission drive device of claim 4, wherein the first function is light emission as a daytime running lamp and the second function is light emission as a clearance lamp, or
   the first function is light emission as a stop lamp and the second function is light emission as a tail lamp.

6. The light emission drive device of claim 3, wherein the first function is light emission as a daytime running lamp and the second function is light emission as a clearance lamp, or
   the first function is light emission as a stop lamp and the second function is light emission as a tail lamp.

7. The light emission drive device of claim 2, wherein the first function is light emission as a daytime running lamp and the second function is light emission as a clearance lamp, or
   the first function is light emission as a stop lamp and the second function is light emission as a tail lamp.

8. The light emission drive device of claim 1, wherein the dimming voltage generator generates the dimming voltage that varies depending on a resistance value of a temperature sensor.

9. The light emission drive device of claim 8, wherein the dimming voltage generator is configured to prevent the dimming voltage from varying depending on the resistance value of the temperature sensor when causing the light emitting element to perform light emission of the second function.

10. The light emission drive device of claim 9, wherein the first function is light emission as a daytime running lamp and the second function is light emission as a clearance lamp, or
    the first function is light emission as a stop lamp and the second function is light emission as a tail lamp.

11. The light emission drive device of claim 8, wherein the first function is light emission as a daytime running lamp and the second function is light emission as a clearance lamp, or
    the first function is light emission as a stop lamp and the second function is light emission as a tail lamp.

12. The light emission drive device of claim 1, wherein the first function is light emission as a daytime running lamp and the second function is light emission as a clearance lamp, or
    the first function is light emission as a stop lamp and the second function is light emission as a tail lamp.

13. A vehicle lamp comprising:
    a light source device having a light emitting element; and
    the light emission drive device of claim 1.

* * * * *